(12) United States Patent
Gross

(10) Patent No.: US 6,305,155 B1
(45) Date of Patent: Oct. 23, 2001

(54) SYSTEM FOR COMPENSATING FOR A PRESSURE LOSS IN THE COOLING-AIR DUCTING IN A GAS TURBINE PLANT

(75) Inventor: Heinz-Jürgen Gross, Mülheim an der Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/592,227

(22) Filed: Jun. 12, 2000

Related U.S. Application Data

(62) Division of application No. 09/277,282, filed on Mar. 26, 1999, now Pat. No. 6,089,010, which is a continuation of application No. PCT/DE97/02059, filed on Sep. 12, 1997.

(30) Foreign Application Priority Data

Sep. 26, 1996 (DE) .............................. 196 39 624

(51) Int. Cl.⁷ ...................................... F02C 7/18
(52) U.S. Cl. ......................... 60/39.02; 60/39.75
(58) Field of Search ................ 60/39.02, 39.07, 60/39.75, 39.183; 415/116

(56) References Cited

U.S. PATENT DOCUMENTS

| | | | |
|---|---|---|---|
| 2,940,257 | 6/1960 | Eckert et al. | 60/39.75 |
| 3,663,118 | 5/1972 | Johnson | 415/116 |
| 5,163,285 | 11/1992 | Mazeaud et al. | 60/39.07 |
| 5,782,076 | 7/1998 | Huber et al. | 60/39.75 |

*Primary Examiner*—Louis J. Casaregola
(74) *Attorney, Agent, or Firm*—Herbert L. Lerner; Laurence A. Greenberg; Werner H. Stemer

(57) ABSTRACT

A structural part of a gas turbine plant is cooled by branching off a partial mass air stream, after being compressed by a compressor of the gas turbine plant, from a main mass air stream. The cooling partial mass air stream is ducted in a closed duct to the structural part to be cooled. At the same time, the partial mass air stream undergoes, independently of the main mass air stream, additional compression which is carried out by utilizing the rotational energy of a turbomachine shaft of the gas turbine plant. The novel gas turbine plant therefore is provided with a secondary compressor. The invention is suitable particularly for use in stationary gas turbine plants.

6 Claims, 2 Drawing Sheets

SYSTEM FOR COMPENSATING FOR A PRESSURE LOSS IN THE COOLING-AIR DUCTING IN A GAS TURBINE PLANT

CROSS-REFERENCE TO RELATED APPLICATION

This is a division of U.S. application Ser. No. 09/277,282, filed Mar. 26, 1999, (U.S. Pat. No. 6,089,010) which was a continuation of copending International application No. PCT/DE97/02059, filed Sep. 12, 1997, which designated the United States.

BACKGROUND OF THE INVENTION

FIELD OF THE INVENTION

The invention lies in the field of applied thermodynamics. Specifically, the present invention relates to a method for cooling a structural part of a gas turbine plant and to a corresponding gas turbine plant. The gas turbine plant has a turbomachine shaft, a compressor and a cooling device. The cooling device is formed with a first duct for a main air stream and a second duct for a partial air stream. The cooling device thereby utilizes the main and the partial air streams which are compressed by the compressor of the gas turbine plant. One end of the first duct of the cooling device opens directly or indirectly into a compression region of the compressor. The term "compression region" as used herein means, in particular, respective stages of a turbocompressor. According to the instantly disclosed invention, however, the "compression region" also includes the region downstream of the compressor in the direction of flow, such as the outlet diffuser.

In order to effectively increase the efficiency and the power of gas turbines, it is an object of continuous development to raise the turbine inlet temperature. The highly heated gas which enters the first turbine stage and flows out of the combustion chamber subjects this stage to particularly severe attack. Highly heat-resistant metallic materials allow inlet temperatures of about 600° C. in stationary gas turbine plants, and in the case of aircraft engines they may even be about 900° C. If higher working temperatures are required, at least the first turbine stage must be cooled. This is all the more necessary because the turbine stage itself also undergoes corrosion stresses due to the aggressiveness and oxygen content of the hot combustion gas and due to the centrifugal stress on the turbine rotor. To cool the first guide blades and moving blades of the gas turbine, it is therefore known to extract a partial mass air stream from the compressed main mass air stream downstream of the compressor, and, by passing the combustion chamber, feed the the partial mass air stream directly to cooling ducts of the guide blades via the housing and to the moving blades of the first rows through the rotor. The blades can then be cooled by convection cooling, film cooling or else transpiration cooling to such temperatures as ensure that the blades have an acceptable useful lifetime.

Of course, the partial mass air stream branched off from the main mass air stream causes the efficiency of the gas turbine plant to be impaired. The size of the branched-off partial mass air stream must therefore be dimensioned in such a way, that on the one hand, sufficient cooling, but, on the other hand, also high efficiency is achieved. For this purpose, it is also necessary for pressure losses to be minimized. For example where the partial air stream is concerned, a pressure loss occurs because delivery conduit losses and pressure losses due to cooling ducting occur. It is therefore necessary, after cooling, to feed the partial mass air stream back to the hot working gases, then flowing out of the combustion chamber, in such a way that the pressure of the partial mass air stream can still be utilized by the turbine.

It is also known that, in the case of large stationary plants, there is an additional external compressor which compresses the partial mass stream intended for cooling, in order to compensate pressure losses. However, the additional compressor likewise requires drive energy in the form of electrical current. The calculation of an efficiency of the gas turbine plant must then take this energy into account accordingly. The greater it is, the lower the efficiency of the gas turbine plant becomes.

German published patent application DE 33 10 529 A1 discloses the cooling of a gas turbine by means of compressor air which is further compressed by a centrifugal compressor. The centrifugal compressor is formed essentially by a rotating flow duct. The concept of compression by means of a centrifugal compressor necessitates considerable radial distances over which the air to be compressed must be ducted. Such radial distances are achieved with rotor discs which are typical of jet engines. U.S. Pat. No. 3,936,215 also describes a centrifugal compressor of an engine.

SUMMARY OF THE INVENTION

It is accordingly an object of the invention to provide a system for compensating for the pressure losses due to cooling ducting in a gas turbine plant, which overcomes the above-mentioned disadvantages of the heretofore-known devices and methods of this general type and which is maximized in terms of energy and efficiency.

With the foregoing and other objects in view there is provided, in accordance with the invention, a method of cooling a structural part of a gas turbine plant, which comprises:

compressing a main mass air stream in a compressor;

branching off a cooling partial mass air stream from the main mass air stream compressed in the compressor;

ducting the cooling partial mass air stream in a closed, spatially stationary duct to a structural part to be cooled; and additionally compressing the cooling partial mass air stream independently of the main mass air stream in a radial stage disposed concentrically on an outer circumference of an axial stage.

In other words, the method according to the invention cools a structural part of a gas turbine plant by means of the partial mass air stream (after having been compressed together with the main mass air stream, by a compressor of the gas turbine plant). The "cooling" partial mass air stream is thereafter branched off from the main mass air stream and subsequently ducted, in a closed, spatially stationary duct, to the structural part to be cooled. The partial mass air stream undergoes, independently of the main mass air stream, additional compression which is carried out by utilizing the rotational energy of a turbomachine shaft of the gas turbine plant. The additional compression is derived from the radial stage disposed concentrically on the outer circumference of an axial stage of the compressor. Since the duct is spatially stationary, this utilization does not take the form of centrifugal compression. Additional compression by means of the turbomachine shaft which is rotating in any case is a way of making it possible to compensate pressure losses particularly advantageously in energy terms. That turbomachine shaft of the gas turbine plant which is utilized for additional compression may be that of the turbine, that of the compressor which has compressed the main mass air stream or, for example in the case of a "split-shaft" plant, even the shaft of the compressor additionally belonging to the gas turbine plant. Since a high energy is available by virtue of the inertia forces of the rotating shaft which take effect in any case, the utilization of this rotational energy for the additional compression of the partial mass air stream is also advantageous on account of the existing energy density.

The rotational energy of the turbomachine shaft may be utilized in various ways. Advantageously, the additional compression is carried out by means of blading on the turbomachine shaft. The step is recited as guiding the cooling partial mass air stream through a turbine blade and thereby cooling the turbine blade. This is advantageous particularly because the know-how and technology from hitherto conventional bladings can be transferred to this blading. However, the rotational energy may also be converted into pressure, for example, by other suitable means, such as guide plates, which are arranged adjacent to the branch-off of the partial mass air stream from the main mass air stream. The compensation of the pressure loss of the cooling-air ducting of the partial mass air stream by the suitable utilization of the rotational energy of the turbomachine shaft may be so great that the partial mass air stream can also be guided through a blade. A blade of this type is, for example, a guide blade or moving blade of the first turbine inlet stages. These can thus also be cooled to suitable temperatures by means of the cooling methods known hitherto.

In accordance with an added feature of the invention, the cooling partial mass air stream is filtered. Particularly for film cooling and certainly for transpiration cooling, it is necessary for the cooling air to have some degree of purity in respect of the particles contained in the air. On the one hand, this degree of purity of the cooling air can be achieved by means of filter inserts, on the other hand use may be made of a physical law in selecting the location of the branch-off of the partial mass air stream from the main mass air stream: by virtue of the rotation of the turbo-compressor shaft in the gas turbine plant, particles in the flow duct are carried outwards according to their greater density in relation to the surrounding air if, therefore, the branch-off for the partial mass air stream is located in the vicinity of the shaft, a relatively particle-free partial mass air stream is extracted, use being made of the virtual self-purifying effect of compression.

In accordance with another feature of the invention, the compressing step comprises compensating for at least one pressure loss resulting from a ducting of the cooling partial mass air stream in the closed duct. It is a further advantage of utilizing the rotational energy that the additional compression of the partial mass air stream is carried out in such a way that a pressure loss due to the ducting of the partial mass air stream in the closed duct is at least compensated. In particular, the partial mass air stream is compressed in such a way that not only is it capable of cooling blades of the turbine, but it is also possible to compensate pressure losses which occur during the cooling of other structural parts of the gas turbine plant. This refers, for example, to the combustion chamber. Furthermore, the compensation of the pressure loss due to the ducting of the part air mass makes it possible, after cooling has taken place, to feed the partial mass air stream, for example, to the combustion chamber. It is fed to the latter itself in a controlled manner. The pressure loss can be compensated, in, particular, in such a way that the partial mass air stream, when it enters the combustion chamber, has at least almost the same pressure as the main mass air stream, likewise ducted to the combustion chamber, downstream of the branch-off. However, the partial mass air stream may, of course, also have a higher pressure if there is corresponding additional compression.

In a further embodiment of the invention, in the case of a controlled feed of the partial mass air stream into the combustion chamber, additional swirling of the gases located there and an advantageous conversion at least of the partial mass air stream within the different zones of the combustion chamber can be achieved. For example, better homogenization of fuel and air or even of converted gases with not yet converted gases is achieved in this way. Furthermore, in the case of a controlled inflow into the primary zone of the combustion chamber, the temperature is lowered, so that the formation of thermal nitrogen oxide is likewise reduced. However, high additional compression of the partial mass air stream can also be utilized for other practical purposes. A partial mass air stream additionally compressed and branched off according to the invention may be used wherever high air pressures are required in the gas turbine plant. For this purpose, advantageously, the partial mass air stream branched off from the main mass air stream is subdivided even further.

In an alternative mode of the system, the method comprises the steps of ducting the cooling partial mass air through a hollow turbine moving blade and then past a turbine guide blade; and subsequently ducting the cooling partial mass air stream to the structural part of the gas turbine to be cooled, particularly to a combustion chamber of the gas turbine.

With the above and other objects in view there is also provided, in accordance with the invention, a gas turbine plant, comprising:

a turbomachine shaft;

an axial compressor disposed on the turbomachine shaft for compressing a main mass air stream and a cooling partial mass air stream, the axial compressor having a compression region and an axial stage with an outer circumference;

a cooling air ducting device formed with a first duct for guiding the main mass air stream compressed by the axial compressor and a second duct for guiding a partial mass air stream compressed by the axial compressor;

the first duct having one end opening into the compression region of the axial compressor, and the second duct having one end opening into the compression region of the axial compressor adjacent the first duct;

the second duct, opposite the first duct, having an additional secondary compressor formed as a radial stage disposed concentrically on the outer circumference of the axial stage of the axial compressor.

In accordance with again an added feature of the invention, the axial compressor has a final compression region, and the second duct opens into the final compression region.

In accordance with again another feature of the invention, the turbine has a turbine moving blade with a sealing device, the turbine moving blade being formed with a hollow interior and having a duct leading through the sealing device for ducting the cooling partial mass air stream, and a guide blade disposed behind the sealing device in a flow direction for generating a pressure increase in the cooling partial mass air stream.

Finally, there is provided in accordance with the invention, a gas turbine plant with a turbomachine shaft, an axial compressor on the turbomachine shaft, and a cooling air ducting device which uses the main mass air stream compressed by the axial compressor and the cooling partial mass air stream. The secondary compressor of the second duct is formed by a hollow turbine moving blade with a sealing device, a duct leading through the sealing device, and a guide blade arranged behind the sealing device in a flow direction, i.e. in flow technology.

Although the invention is illustrated and described herein as embodied in a system for the compensation of the pressure loss of cooling-air ducting in a gas turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
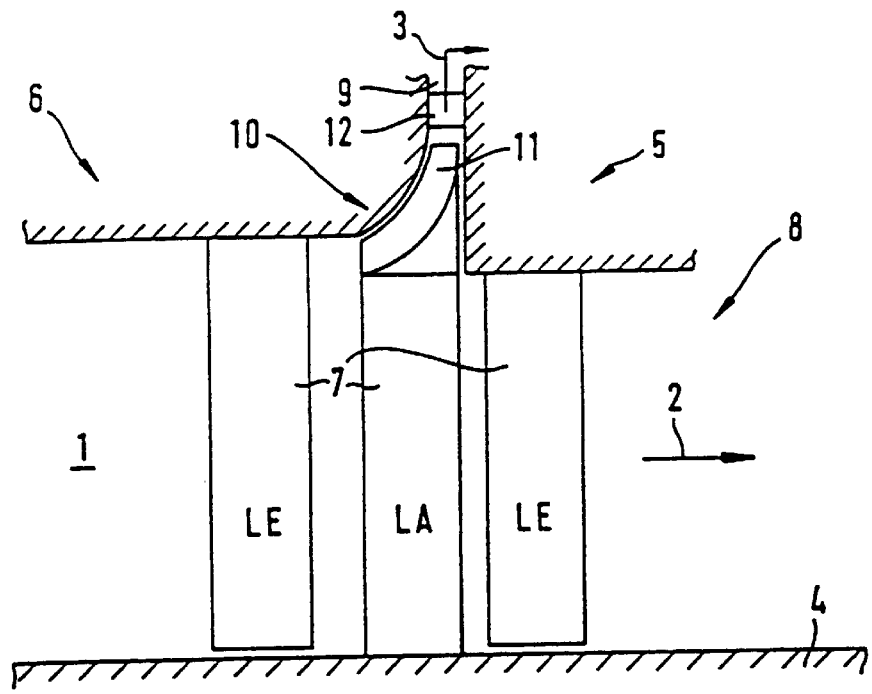
FIG. 1 is a partial diagrammatic view of a radially mounted compressor stage on a last compressor moving blade.

Referring now to the figures of the drawing in detail and first, particularly, to FIG. 1 thereof, there is seen a detail of a gas turbine plant, in which, by splitting compressed air 1 into a main mass air stream 2 and a branched-off partial mass air stream 3, additional compression of the partial mass air stream 3 becomes possible. The blading 7 of the compressor 6 is located on the turbomachine shaft 4 and on the housing 5 of the compressor 6. Two guide blades LE and one moving blade LA are illustrated. A first duct 8 and a second duct 9 open into the illustrated compressor region. The main mass air stream 2 flows in the first duct 8 and the partial mass air stream 3 flows in the second duct. The two ducts 8, 9 form a cooling device for the gas turbine plant, since they can cool one or more structural parts of the gas turbine plant, depending on the design and consequently on the ducting of the respective mass air stream. The first duct 8 may open indirectly or, as illustrated, directly at one end into the compression regions of the compressor 6; indirect opening occurs, for example, in a further embodiment of the plant, in which one end of the first duct 8 commences downstream of the outlet diffuser of the compressor 6. The outlet diffuser is not illustrated in FIG. 1. The second duct 9 opens out at one end at a point that is adjacent or integral (at least adjacent) with the first duct 8. The second duct 9 is spatially stationary and, according to the invention, in contrast to the first duct 8, has an additional secondary compressor 10 which can be driven by the turbomachine shaft 4 of the compressor 6. The secondary compressor 10 is not a centrifugal compressor. Such a system would necessitate a rotating duct 9.

In the embodiment of FIG. 1, the secondary compressor 10 is formed by attaching a radial compressor stage having a radial moving blade 11 and a radial guide blade 12. The radial compressor stage has a somewhat higher pressure ratio in relation to the axial compressor stage of the blading 7. It is thereby possible to compensate the pressure losses which occur in the second duct 9, for example due to the cooling of heat shields of a combustion chamber of the gas turbine plant. Those heat shields, incidentally, are not illustrated in FIG. 1 for reasons of clarity.

In a preferred embodiment, the second duct 9 opens into the final compression region of the compressor 6. As a result, the partial mass air stream 3 has a high pressure in the second duct 9. Moreover, the "final compression region" is intended to mean the last blade rows of the compressor 6 in the direction of flow of the air 1. Particularly by way of the illustrated attachment of the radial compressor stages to the last moving blade LA of the compressor 6, when the partial mass air stream 3 subsequently flows into the combustion chamber after cooling has taken place the pressure loss to be compensated by the secondary compressor 10 advantageously has to be made up only from an already high pressure level. The utilization of the rotational energy in the turbomachine shaft 4 can thereby be maintained at an extremely low level. To illustrate this once more: the turbomachine shaft 4 which drives the secondary compressor 10 is an integral part of the gas turbine plant. A shaft of an additional external compressor, which is utilized solely for compensating the pressure losses in the second duct 9, is not to be meant by the turbomachine shaft 4. An external compressor of this type would not be considered a secondary compressor 10 according to the invention.

Figure 2:
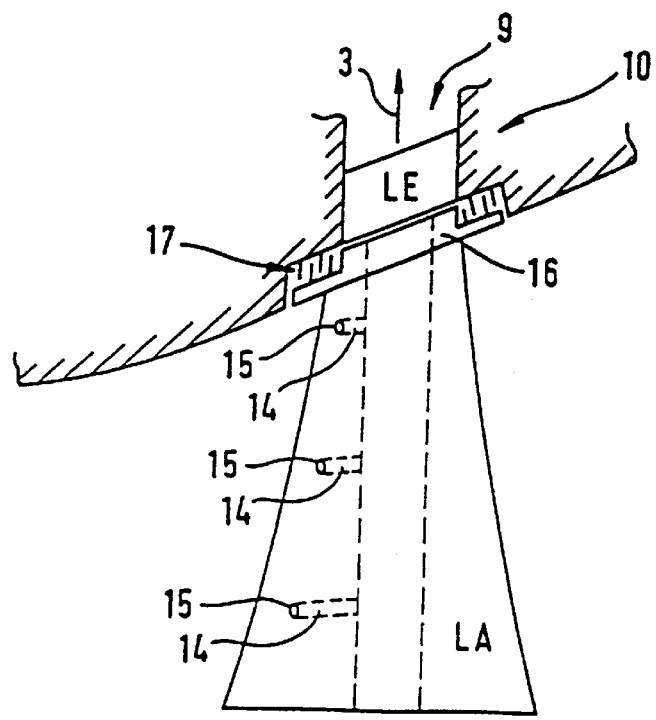
FIG. 2 is a partial diagrammatic view of a turbine moving blade as a radial compressor.

Referring now to FIG. 2, there is shown a further configuration of the secondary compressor 10. The first turbine moving-blade row illustrated is used as a radial compressor. The partial mass air stream 3 flows through the hollow turbine moving blade LA. The second duct 9 is indicated by broken lines, with its conduit feeds 14 to the film-cooling bores 15, in the hollow turbine moving blade LA. The turbine moving blade LA has a cover strip 16 which is likewise partially hollow for the purpose of forming the second duct 9. Leakage losses of the partial mass air stream 3 are maintained at a low level by means of labyrinth gaskets 17. Depending on the cooling system, i.e., the appropriate layout of the second duct 9, the moving blade LA may also be sufficiently cooled by convection cooling alone. There is then no need for mass streams to be branched off from the partial mass air stream 3 via the conduit feeds 14 to the film-cooling bores 15. The pressure rise of the partial mass air stream 3 takes place in the guide-blade ring which is indicated by the guide blade LE. The secondary compressor 10 thus formed can be designed in such a way that at least sufficient pressure compensation of flow losses is brought about. The illustrated solution of providing the hollow moving blade LA with a cover strip 16 and of following it with a guide blade LE is not the only possibility for utilizing the rotational energy of the turbine shaft. On the contrary, it will be understood that any further solution which utilizes the rotation of the turbine moving blade LA for accelerating the partial mass air stream 3 flowing through lies within the invention.

The exemplary embodiment of FIG. 2 provides a further advantage: The partial mass air stream 3 is heated as a result of the cooling of the moving blade LA. Since the second duct 9 is designed so that the partial mass air stream 3 likewise cools the outer wall of the combustion chamber of the gas turbine plant, the partial mass air stream 3 is heated even further. The result of the heat flux thus absorbed is that, at the opening of the second duct 9 into the combustion chamber, the heat flux is further utilized by the flow of the partial mass air stream 3 into the latter. If air streams having mutually different temperatures are required for the combustion chamber, for example a more-cooling partial mass air stream 3 in the primary zone for reducing the nitrogen oxides and a more-heated partial mass air stream 3 for intermixing with the fuel, the gas turbine plant may also possess a plurality of second ducts 9. These are in each case designed and routed differently and therefore receive mutually different heat fluxes during cooling.

Figure 3:
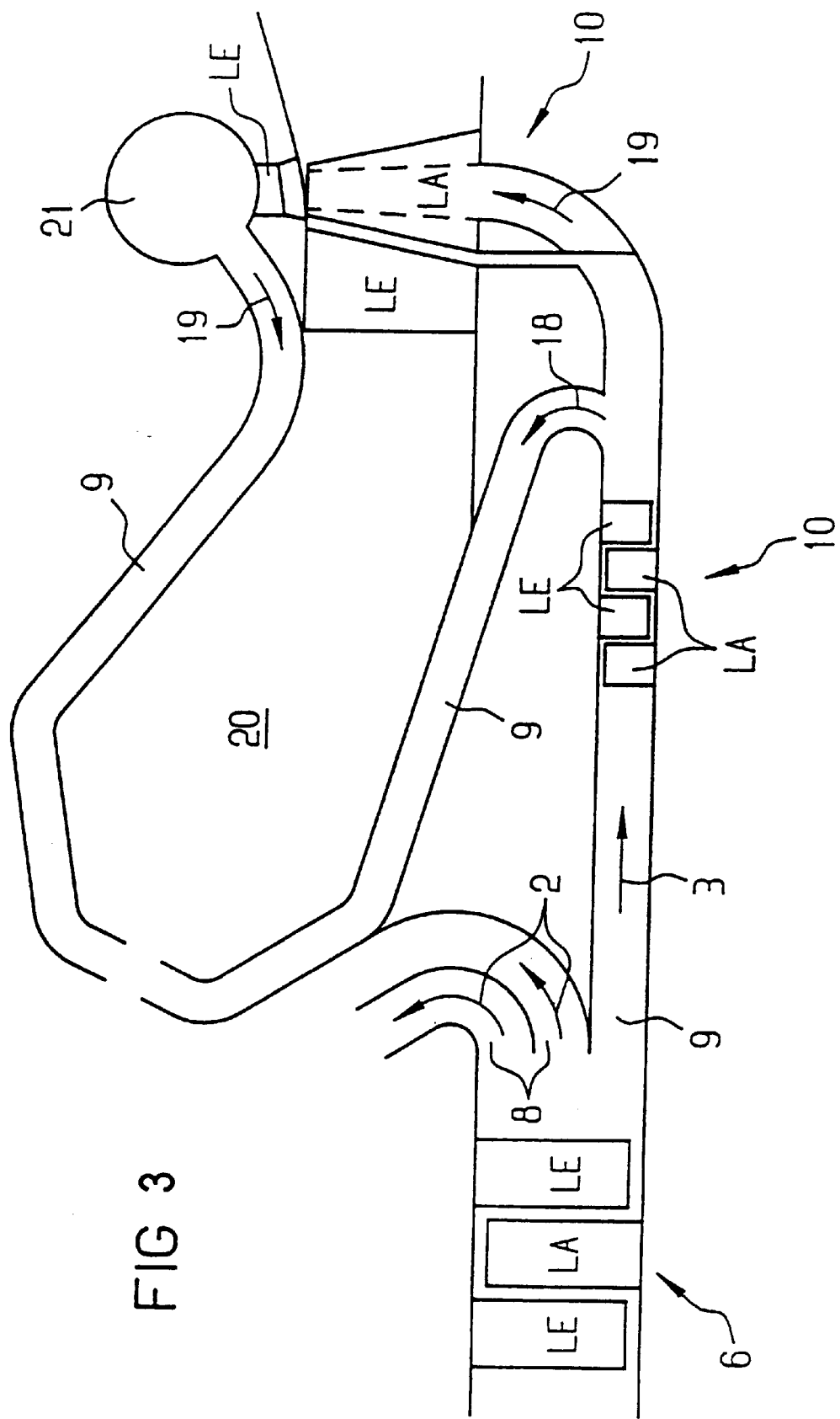
FIG. 3 is a diagrammatic view of a combination of various embodiments of the invention with ducting of the partial mass air stream in a gas turbine plant.

Referring now to FIG. 3, there is shown an advantageous combination of different secondary compressors 10 arranged in a gas turbine plant. The compressor 6 is followed by two first ducts 8. A second duct 9 opens out, adjacent to these, at the final compression region of the compressor 6. While the main mass air stream 2, divided into the two first ducts 8, is ducted directly to the non-illustrated burner, the partial mass air stream 3 is first additionally compressed by means of the axial secondary compressor 10. The partial mass air stream 3 is subsequently divided into two further mass streams 18 and 19. While the mass stream 18 is then ducted directly along the outer wall of the combustion chamber 20 for cooling, the other mass stream 19 undergoes further additional pressure compensation by means of the moving blade LA of the gas turbine. That moving blade is designed as a secondary compressor 10. Here too, the pressure rise is carried out by means of the downstream guide blade LE. The latter is followed by a drum 21. The drum 21 serves, on the one hand, as a steadying volume for the flow. Flow losses due to deflections or turbulences are thereby minimized. On the other hand, the drum 21 also possesses a particular storage volume, from which the downstream further part of the second duct 9 is supplied with the mass stream 19. The first guide blade LE of the turbine is likewise cooled by the mass stream 19 coming from the drum 21. The first duct 8 and the second duct 9 are advantageously designed as closed cooling ducts. Although not illustrated in any more detail here, the first duct 8 may be configured in such a way that it too performs some cooling, for example the cooling of the outer wall of the combustion chamber 20.

The invention affords a possibility of compensating pressure losses due to cooling air conduits in a gas turbine plant advantageously in energy terms. The variants of an embodiment of the invention which are characterized by different features can be selected in each case according to the particular gas turbine plant and, also, be combined with one another. A preferred application field of the invention is in stationary gas turbine plants, in which, on account of the long operating periods desired, cooling required for this purpose is also necessary. In the case of smaller gas turbine plants, particularly those that are moveable, such as aircraft engines, the invention allows the possibility of compressing a mass air stream for cooling, and thereby of compensating pressure losses, in a simple way and advantageously in energy terms.

I claim:

1. A method of cooling a structural part of a gas turbine plant, which comprises:

compressing a main mass air stream in a compressor;

branching off a cooling partial mass air stream from the main mass air stream compressed in the compressor;

ducting the cooling partial mass air stream in a closed, spatially stationary duct to a structural part to be cooled; and additionally compressing the cooling partial mass air stream independently of the main mass air stream in a radial stage disposed concentrically on an outer circumference of an axial stage.

2. The method according to claim 1, which comprises guiding the cooling partial mass air stream through a turbine blade and thereby cooling the turbine blade.

3. The method according to claim 1, which further comprises filtering the cooling partial mass air stream.

4. The method according to claim 1, wherein the compressing step comprises compensating for at least one pressure loss resulting from a ducting of the cooling partial mass air stream in the closed duct.

5. A gas turbine plant, comprising:

a turbomachine shaft;

an axial compressor disposed on said turbomachine shaft for compressing a main mass air stream and a cooling partial mass air stream, said axial compressor having a compression region and an axial stage with an outer circumference;

a cooling air ducting device formed with a first duct for guiding the main mass air stream compressed by said axial compressor and a second duct for guiding a partial mass air stream compressed by said axial compressor;

said first duct having one end opening into said compression region of said axial compressor, and said second duct having one end opening into said compression region of said axial compressor adjacent said first duct;

said second duct having an additional secondary compressor formed as a radial stage disposed concentrically on the outer circumference of said axial stage of said axial compressor.

6. The gas turbine plant according to claim 5, wherein said axial compressor has a final compression region, and said second duct opens into said final compression region.

* * * * *